United States Patent
Son

(10) Patent No.: US 7,502,094 B2
(45) Date of Patent: Mar. 10, 2009

(54) REPAIRING DEVICE AND REPAIRING METHOD FOR DISPLAY DEVICE

(75) Inventor: Dong-Il Son, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 133 days.

(21) Appl. No.: 11/261,280

(22) Filed: Oct. 28, 2005

(65) Prior Publication Data

US 2006/0181672 A1    Aug. 17, 2006

(30) Foreign Application Priority Data

Feb. 15, 2005    (KR) .................. 10-2005-0012284

(51) Int. Cl.
*G02F 1/13*    (2006.01)
*G03F 1/00*    (2006.01)

(52) U.S. Cl. .................. 349/192; 349/187; 430/7

(58) Field of Classification Search .......... 349/187, 349/192; 430/7
See application file for complete search history.

(56) References Cited

U.S. PATENT DOCUMENTS

| | | | | |
|---|---|---|---|---|
| 5,280,374 | A * | 1/1994 | Nakai et al. | .............. 349/192 |
| 5,926,246 | A | 7/1999 | Tomita et al. | .............. 349/192 |
| 6,054,235 | A * | 4/2000 | Bryan et al. | .............. 430/7 |
| 6,239,856 | B1 | 5/2001 | Imura et al. | |
| 6,714,269 | B1 | 3/2004 | Huang | |
| 6,812,992 | B2 | 11/2004 | Nemeth | |
| 2002/0101558 | A1 * | 8/2002 | Nemeth | .............. 349/192 |
| 2003/0179325 | A1 * | 9/2003 | Rho et al. | .............. 349/43 |

FOREIGN PATENT DOCUMENTS

| | | |
|---|---|---|
| JP | 09-146060 | 6/1997 |
| JP | 09-325332 | 12/1997 |
| JP | 2001-183615 | 7/2001 |
| JP | 2002-131716 | 5/2002 |
| JP | 2002-341304 | 11/2002 |
| JP | 2002341788 | 11/2002 |
| JP | 2003-029227 | 1/2003 |
| JP | 2003-149619 | 5/2003 |
| JP | 2003-262842 | 9/2003 |
| JP | 2004-160520 | 6/2004 |
| KR | 100182046 | 12/1998 |
| KR | 1999-0083581 | 11/1999 |
| KR | 1020020030897 | 4/2002 |
| KR | 1020030040673 | 5/2003 |
| KR | 1020030058220 | 7/2003 |

OTHER PUBLICATIONS

European Search Report for Application No. 06001787.5; Dated May 12, 2006 (All references in Search Report are cited above).

* cited by examiner

*Primary Examiner*—Michael H Caley
(74) *Attorney, Agent, or Firm*—Cantor Colburn LLP

(57) ABSTRACT

A repairing device for a display device includes a substrate and a color filter disposed on the substrate. The color filter includes a first surface facing the substrate and a second surface disposed opposite to the first surface. The repairing device includes laser equipment illuminating a laser beam focused on the first surface and having a wavelength of greater than about 250 nm.

25 Claims, 17 Drawing Sheets

REPAIRING DEVICE AND REPAIRING METHOD FOR DISPLAY DEVICE

This application claims priority to Korean Patent Application No. 2005-0012284, filed on Feb. 15, 2005, and all the benefits accruing therefrom under 35 U.S.C §119, and the contents of which in its entirety are herein incorporated by reference.

BACKGROUND OF THE INVENTION (a) Field of the Invention

The present invention relates to a repairing device and a repairing method for a display device.

(b) Description of Related Art

Generally, a liquid crystal display (LCD) device includes a liquid crystal (LC) panel assembly including an upper panel and a lower panel provided with pixel electrodes and common electrodes, and an LC layer with dielectric anisotropy interposed between the upper and lower panels. The pixel electrodes are arranged in a matrix and are electrically connected to switching elements such as thin film transistors (TFTs) to be sequentially applied with a data voltage for a row. The common electrodes cover an entire surface of the upper panel and are supplied with a common voltage. A pixel electrode, a common electrode, and the LC layer form an LC capacitor, which together with a switching element connected thereto is a basic unit of a pixel.

The LCD device displays images by adjusting strength of an electric field applied to the LC layer to control a transmittance of light passing through the upper and lower panels. Additionally, for a color display, color filters representing one of primary colors such as red, green and blue colors are disposed in an area of the common electrode opposite to the pixel electrode.

Meanwhile, during a manufacturing process of the LCD device, several tests are performed and defects detected by the tests are repaired. For example, when display signal lines, etc., are disconnected or shorted, or defects at the pixels occur during the manufacturing process the LCD device, the defects are detected via predetermined tests. Such tests include an array test, a visual inspection (VI) test, a gross test, and a module test, and so on.

The array test is used to determine if disconnection of the display signal lines has occurred by applying predetermined voltages to detect whether output voltages are generated or not before a mother glass is divided into separate cells. The VI test is used to determine if disconnection of the display signal lines has occurred by applying predetermined voltages to view the upper and lower panels after the mother glass is divided into separate cells. The gross test is used to determine image quality and the disconnection of the display signal lines by applying predetermined voltages to view a display state of a screen before mounting driving circuits thereon after combining the lower panel and the upper panel. The module test is to determine an optimum operation of the driving circuits after mounting the driving circuits thereon.

The gross test is performed under similar circumstances to a real driving and also detects inferiority of the pixels in a state of making a background of the screen black. A minority portion of the pixels shines brightly due to existence of alien substances within the LC layer or disconnection or shorts of the display signal lines, which is referred to as a bright pixel or a high pixel. Such a bright pixel or high pixel phenomenon occurs in most display devices including LCD devices.

For repairing a high pixel defect, a light blocking member is coated on an external area of the display devices, which is positioned at an outer surface of the upper panel above the high pixel using a chemical vaporization deposition. However, although light does not leak through a front of the display device, light may leak through sides of the display device. Accordingly, the repair may not be performed perfectly.

SUMMARY OF THE INVENTION

The present invention is directed to provide a repairing device and a repairing method for a display device that is capable of repairing pixel defects of a display device.

A repairing device for a display device is provided including a substrate and a color filter disposed on the substrate. The color filter includes a first surface facing the substrate and a second surface disposed opposite to the first surface. The repairing device includes laser equipment illuminating a laser beam focused on the first surface and having a wavelength of greater than about 250 nm.

A repairing method for a display device is provided including a substrate and a color filter disposed on the substrate. The repairing method includes testing the display device, locating laser equipment above the display device, adjusting a focus of a laser beam illuminated from the laser equipment, and illuminating the laser beam onto the color filter, wherein a wavelength of the laser beam is greater than about 250 nm.

BRIEF DESCRIPTION OF THE DRAWINGS

The present invention will become more apparent by describing exemplary embodiments thereof in detail with reference to the accompanying drawings in which.

DETAILED DESCRIPTION OF THE INVENTION

Figure 1:
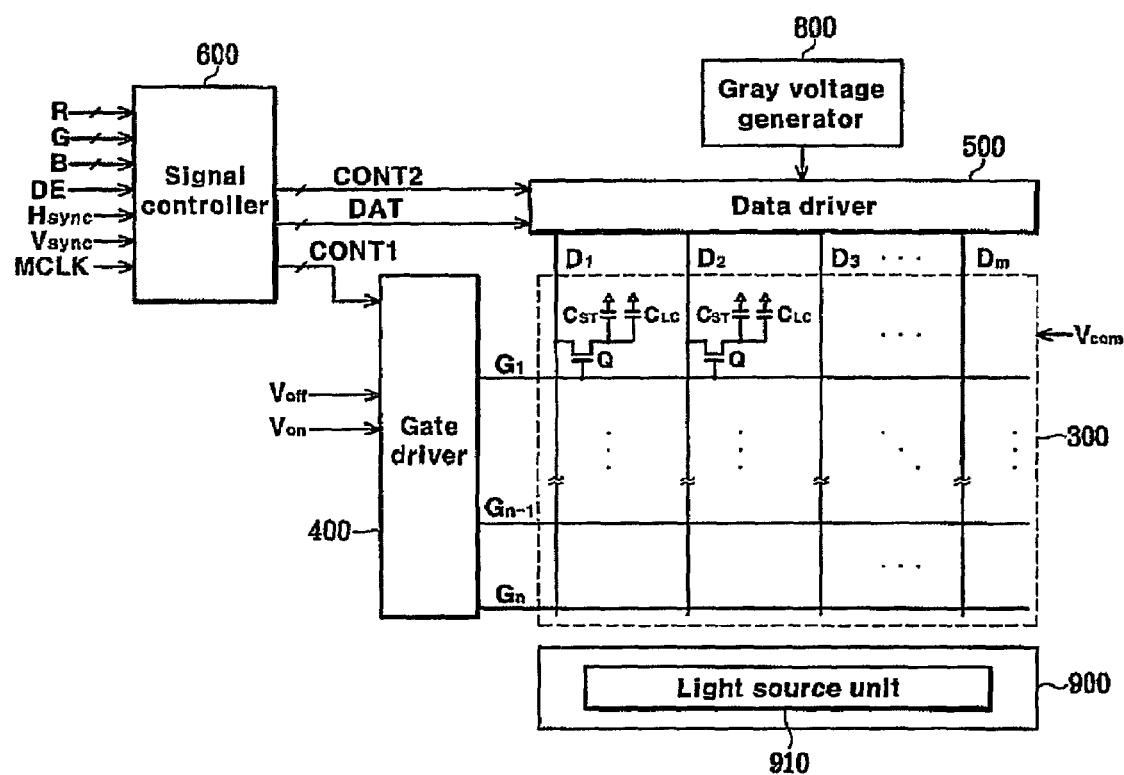
FIG. 1 is a block diagram of a liquid crystal display (LCD) device according to an exemplary embodiment of the present invention.

The present invention will be described more fully hereinafter with reference to the accompanying drawings, in which exemplary embodiments of the invention are shown. This invention may, however, be embodied in many different forms and should not be construed as limited to the embodiments set forth herein.

In the drawings, thicknesses of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, no intervening elements are present.

Figure 2:
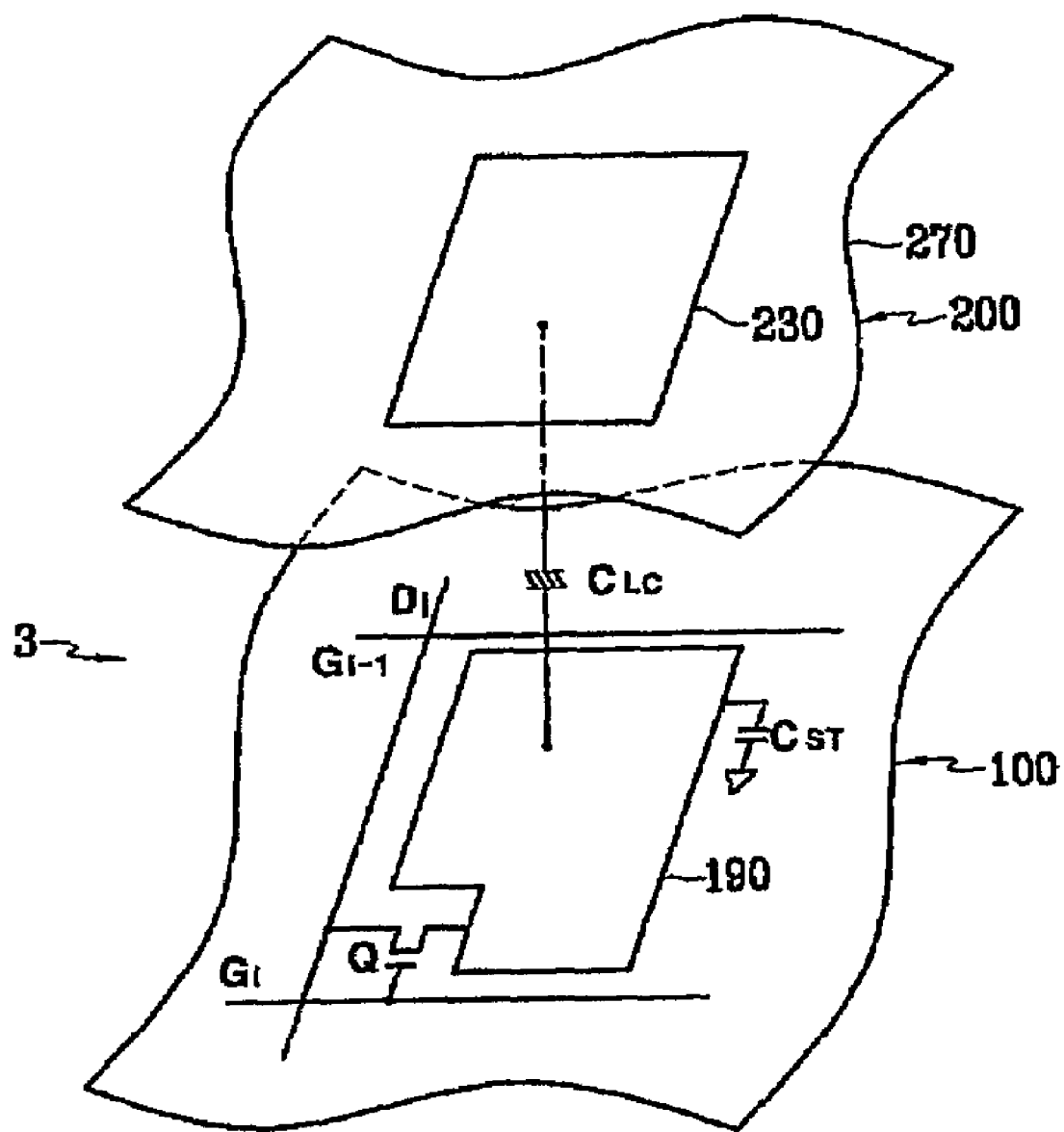
FIG. 2 illustrates a structure and an equivalent circuit diagram of a pixel of an LCD device according to an exemplary embodiment of the present invention.

FIG. 1 is a block diagram of a liquid crystal display (LCD) device according to an exemplary embodiment of the present invention, and FIG. 2 illustrates a structure and an equivalent circuit diagram of a pixel of an LCD device according to an exemplary embodiment of the present invention.

Referring to FIG. 1, an LCD device includes a liquid crystal (LC) panel assembly 300, a gate driver 400 and a data driver 500 electrically connected to the LC panel assembly 300, a gray voltage generator 800 electrically connected to the data driver 500, a backlight unit 900 providing light for the LC panel assembly 300, and a signal controller 600 controlling the above-described elements.

The LC panel assembly 300, in a structural view shown in FIG. 2, includes a lower panel 100, an upper panel 200 and an LC layer 3 interposed between the lower and upper panels 100 and 200. The LC panel assembly 300 also includes display signal lines $G_1$-$G_n$ and $D_1$-$D_m$ and pixels that are connected to the display signal lines $G_1$-$G_n$ and $D_1$-$D_m$ and arranged substantially in a matrix structure.

The display signal lines $G_1$-$G_n$ and $D_1$-$D_m$ are provided on the lower panel 100 and include gate lines $G_1$-$G_n$ transmitting gate signals (called scanning signals) and data lines $D_1$-$D_m$ transmitting data signals. The gate lines $G_1$-$G_n$ extend substantially in a row direction of the LCD device and are substantially parallel to each other. The data lines $D_1$-$D_m$ extend substantially in a column direction of the LCD device that is substantially perpendicular to the row direction and are substantially parallel to each other.

Each pixel includes a switching element Q electrically connected to the display signal lines $G_1$-$G_n$ and $D_1$-$D_m$. Each pixel further includes an LC capacitor $C_{LC}$ and a storage capacitor $C_{ST}$ that are electrically connected to the switching element Q. The storage capacitor $C_{ST}$ may be omitted if unnecessary.

The switching element Q such as a thin film transistor TFT is provided on the lower panel 100 and has three terminals including: a control terminal electrically connected to one of the gate lines $G_1$-$G_n$ (for example, $G_i$); an input terminal electrically connected to one of the data lines $D_1$-$D_m$ (for example, $D_j$); and an output terminal electrically connected to the LC capacitor $C_{LC}$ and the storage capacitor $C_{ST}$.

The LC capacitor $C_{LC}$ includes a pixel electrode 190 disposed on the lower panel 100, a common electrode 270 disposed on the upper panel 200, and the LC layer 3 as a dielectric between the pixel and common electrodes 190 and 270. The pixel electrode 190 is electrically connected to the switching element Q, and the common electrode 270 covers an entire surface of the upper panel 100 and is supplied with a common voltage Vcom. Alternatively, both the pixel electrode 190 and the common electrode 270, which have shapes of bars or stripes, may be provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For a color display, each pixel uniquely represents one of three primary colors such as red, green and blue colors (spatial division) or sequentially represents the three primary colors in time (temporal division), thereby obtaining a desired color. FIG. 2 shows an example of the spatial division in which each pixel includes a color filter 230 representing one of the three primary colors in an area of the upper panel 200 facing the pixel electrode 190. Alternatively, the color filter 230 is provided on or under the pixel electrode 190 on the lower panel 100.

Referring back to FIG. 1, the backlight unit 900 includes an inverter (not shown) and a light source unit 910, and the light source unit 910 is provided at a lower side of the LC panel assembly 300 and includes at least one lamp, such as a cold cathode fluorescent lamp (CCFL), an external electrode fluorescent lamp (EEFL) and a light emitting diode (LED), and so on.

A pair of polarizers (not shown) for polarizing light from the light source unit 910 are attached on outer surfaces of the lower and upper panels 100 and 200 of the LC panel assembly 300.

The gray voltage generator 800 generates one set or two sets of gray voltages related to a transmittance of the pixels. When two sets of the gray voltages are generated, the gray voltages in a first set have a positive polarity with respect to the common voltage Vcom, while the gray voltages in a second set have a negative polarity with respect to the common voltage Vcom.

The gate driver 400 is electrically connected to the gate lines $G_1$-$G_n$ of the LC panel assembly 300 and synthesizes a gate-on voltage Von and a gate-off voltage Voff from an external device to generate gate signals for application to the gate lines $G_1$-$G_n$.

The data driver 500 is electrically connected to the data lines $D_1$-$D_m$ of the LC panel assembly 300 and applies data voltages, which are selected from the gray voltages supplied from the gray voltage generator 800, to the data lines $D_1$-$D_m$.

The gate and data drivers 400 and 500 may include at least one integrated circuit (IC) chip mounted on the LC panel assembly 300 or on a flexible printed circuit (FPC) film in a tape carrier package (TCP) type, which are attached to the LC panel assembly 300. Alternately, the gate and data drivers 400 and 500 may be integrated into the LC panel assembly 300 along with the display signal lines $G_1$-$G_n$ and $D_1$-$D_m$ and TFT switching elements Q. The signal controller 600 controls the gate driver 400 and the data driver 500.

Operation of the LCD device will now be described in detail referring to FIG. 1.

The signal controller 600 is supplied with image signals R, G and B and input control signals controlling a display of the LC panel assembly 300. The input control signals include, for example, a vertical synchronization signal Vsync, a horizontal synchronization signal Hsync, a main clock MCLK, and a data enable signal DE, from an external graphic controller (not shown). After generating gate control signals CONT1 and data control signals CONT2 and processing the image signals R, G and B to be suitable for operation of the LC panel assembly 300 in response to the input control signals, the signal controller 600 provides the gate control signals CONT1 to the gate driver 400, and processed image signals DAT and the data control signals CONT2 to the data driver 500.

The gate control signals CONT1 include a vertical synchronization start signal STV for informing the gate driver of a start of a frame, a gate clock signal CPV for controlling an output time of the gate-on voltage Von, and an output enable signal OE for defining a width of the gate-on voltage Von.

The data control signals CONT2 include a horizontal synchronization start signal STH for informing the data driver 500 of a start of a horizontal period, a load signal LOAD or TP for instructing the data driver 500 to apply the appropriate data voltages to the data lines $D_1$-$D_M$, and a data clock signal HCLK. The data control signals CONT2 may further include an inversion control signal RVS for reversing a polarity of the data voltages with respect to the common voltage Vcom.

The data driver 500 receives the processed image signals DAT for a pixel row from the signal controller 600 and converts the processed image signals DAT into analogue data voltages selected from the gray voltages supplied by the gray voltage generator 800 in response to the data control signals CONT2 from the signal controller 600.

In response to the gate control signals CONT1 from the signal controller 600, the gate driver 400 applies the gate-on voltage Von to the gate lines $G_1$-$G_n$, thereby turning on the switching elements Q connected to the gate lines $G_1$-$G_n$.

The data driver 500 applies the data voltages to corresponding data lines $D_1$-$D_m$ for a turn-on time of the switching elements Q (which is called "one horizontal period" or "1H" and equals one period of the horizontal synchronization signal Hsync, the data enable signal DE, and the gate clock signal CPV). The data voltages are sequentially supplied to corresponding pixels via turned-on switching elements Q.

A difference between the data voltage and the common voltage Vcom applied to a pixel is expressed as a charged voltage of the LC capacitor $C_{LC}$, i.e., a pixel voltage. LC molecules have orientations depending on a magnitude of the pixel voltage and the orientations determine a polarization of light from the light source unit 910 passing through the LC capacitor $C_{LC}$. The polarizers convert light polarization into light transmittance.

By repeating the above-described procedure, all gate lines $G_1$-$G_n$ are sequentially supplied with the gate-on voltage Von during a frame, thereby applying the data voltages to all pixels. When a next frame starts after finishing one frame, the inversion control signal RVS applied to the data driver 500 is controlled such that a polarity of the data voltages is reversed ("frame inversion"). The inversion control signal RVS may be controlled such that the polarity of the data voltages flowing in a data line in one frame is reversed (e.g.: "row inversion", "dot inversion"), or the polarity of the data voltages in one packet is reversed (e.g.: "column inversion", "dot inversion").

A structure of an LCD device will now be described in detail with reference to FIGS. 3-6.

Figure 3:
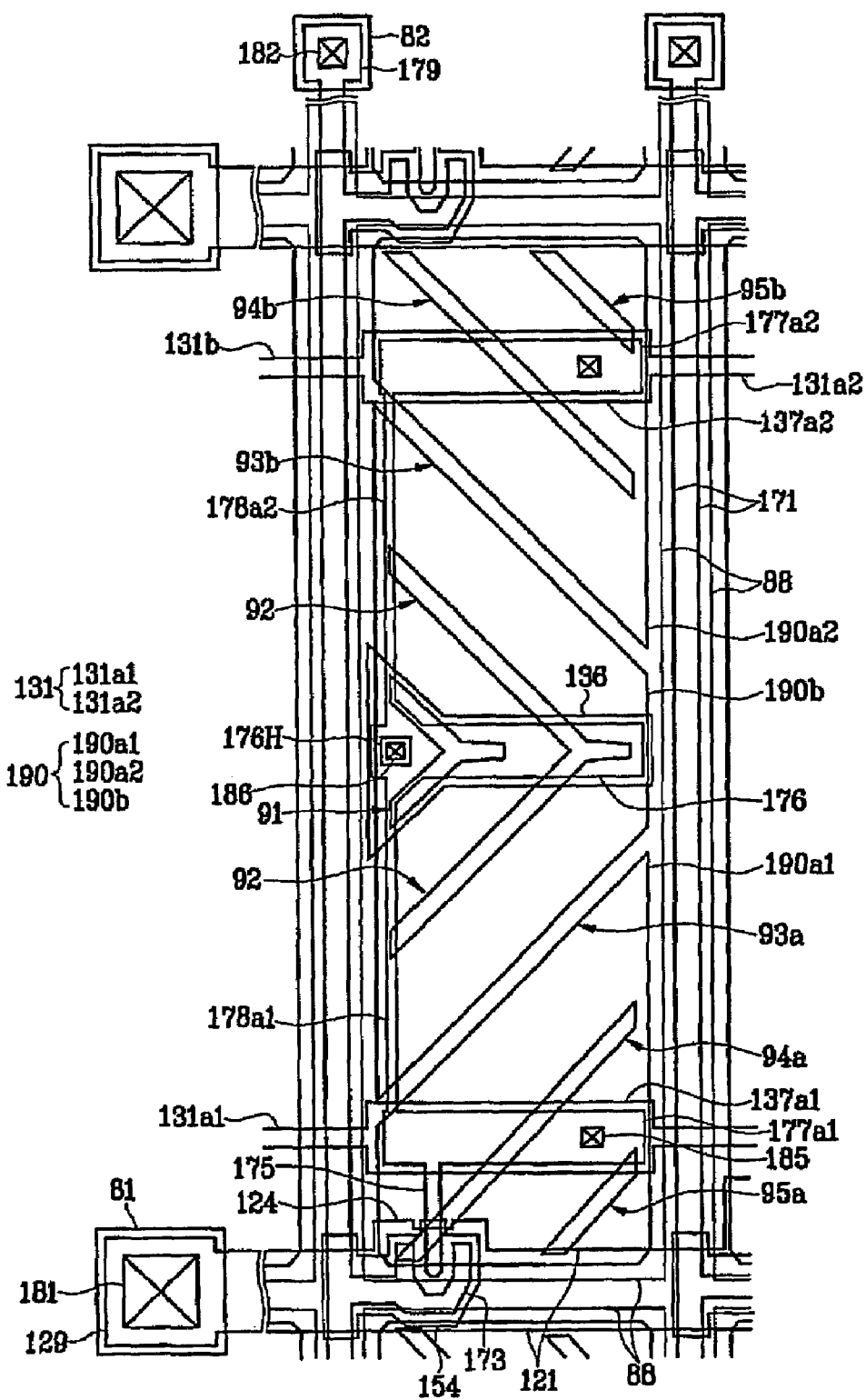
FIG. 3 is a layout view of a thin film transistor (TFT) array panel of an LCD device according to an exemplary embodiment of the present invention.
Figure 4:
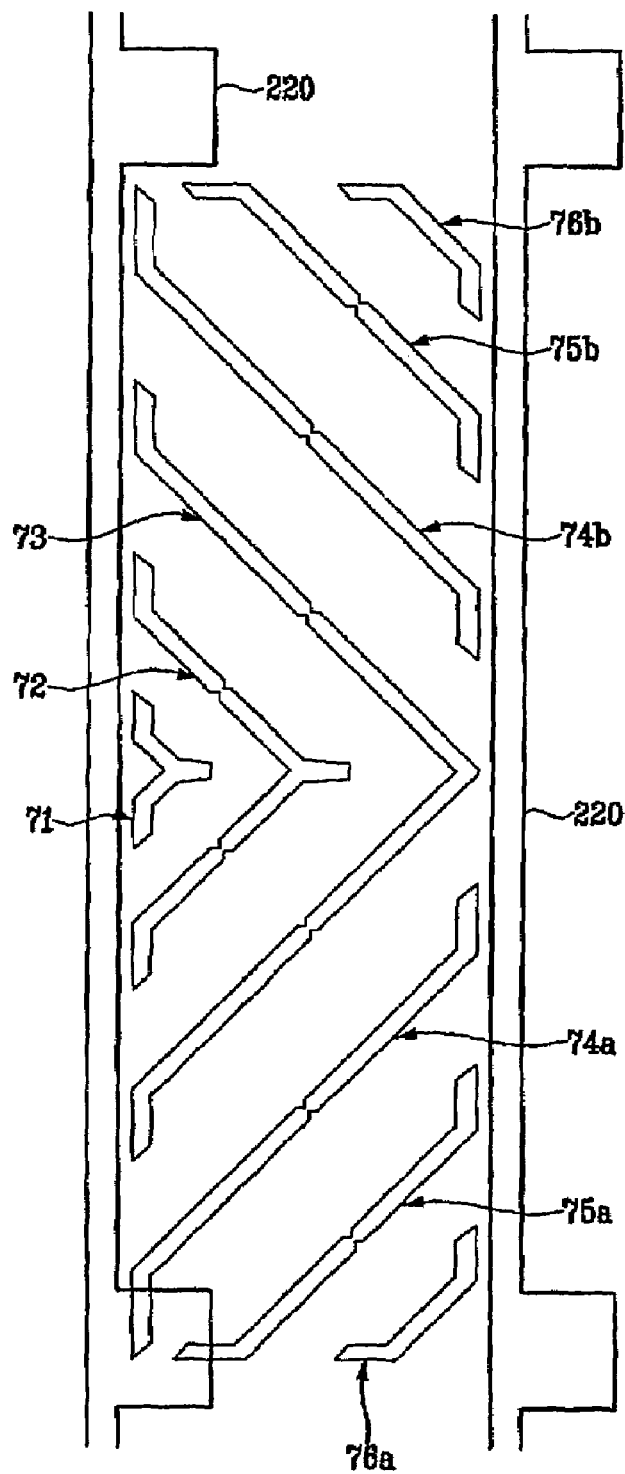
FIG. 4 is a layout view of a common electrode panel of an LCD device according to an exemplary embodiment of the present invention.
Figure 5:
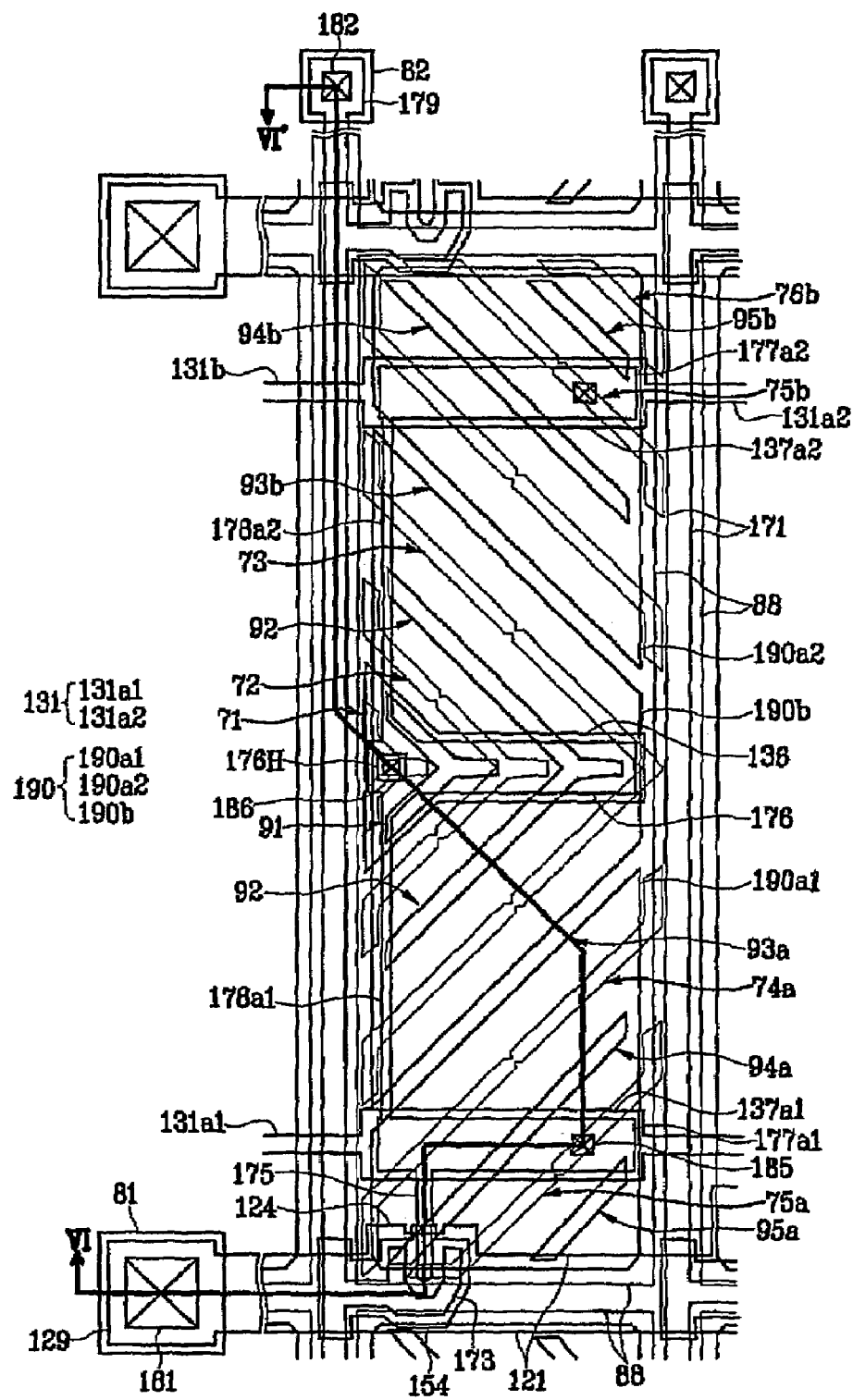
FIG. 5 is a layout view of an LCD device including the TFT array panel shown in FIG. 1 and the common electrode panel shown in FIG. 4.
Figure 6:
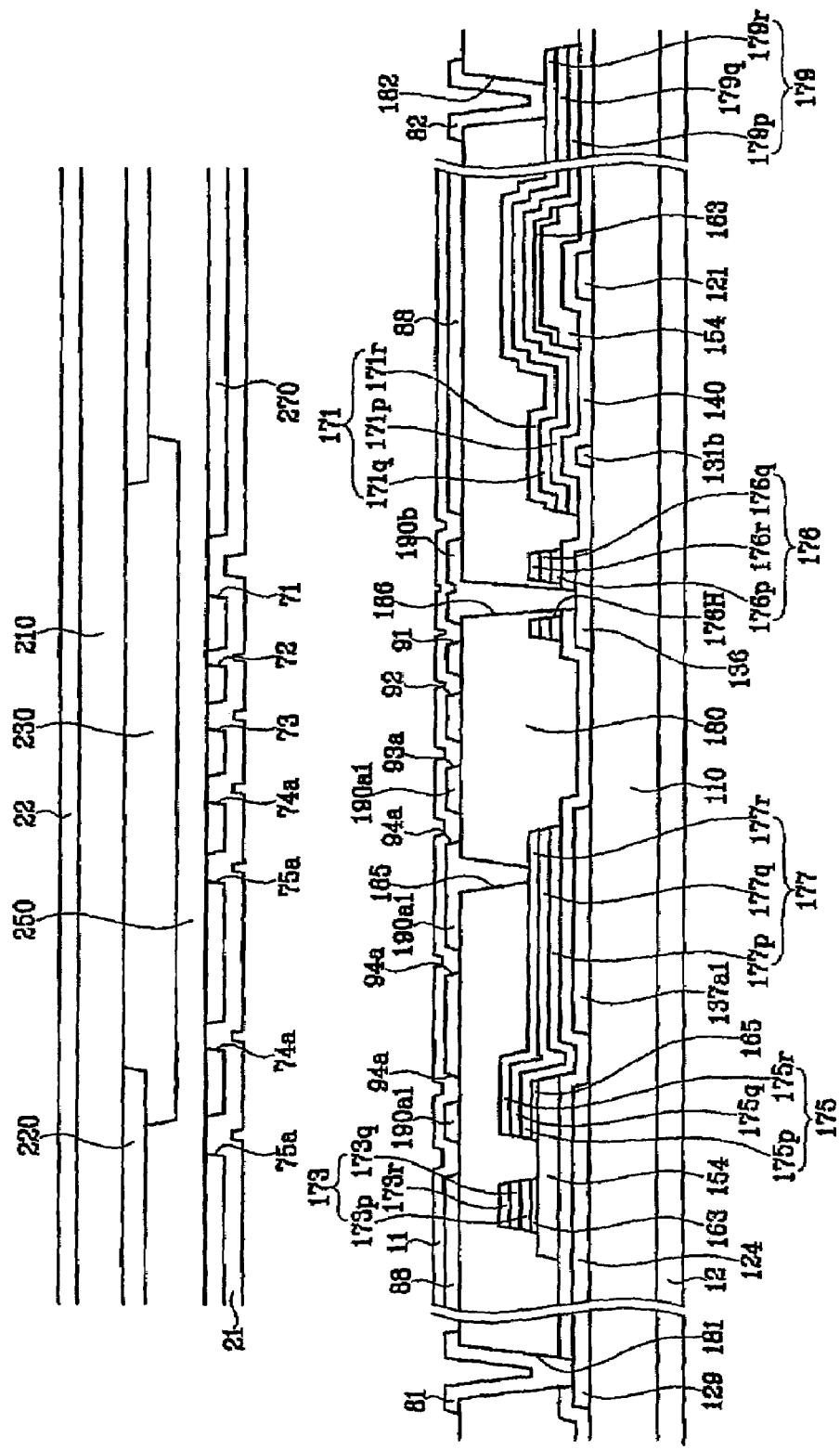
FIG. 6 is a sectional view of the LCD device shown in FIG. 5 taken along line VI-VI'.

FIG. 3 is a layout view of a TFT array panel of an LCD device according to an exemplary embodiment of the present invention, FIG. 4 is a layout view of a common electrode panel of an LCD device according to an exemplary embodiment of the present invention, FIG. 5 is a layout view of an LCD device including a TFT array panel shown in FIG. 3 and a common electrode panel shown in FIG. 4, and FIG. 6 is a sectional view of the LCD device shown in FIG. 5 taken along line VI-VI'.

Referring to FIGS. 3-6, an LCD device according to an exemplary embodiment of the present invention includes the lower panel 100, which is also called a TFT array panel, the upper panel 200, which is also called a common electrode panel, and the LC layer 3 interposed between the lower and upper panels 100 and 200.

The lower panel 100 will now be described in detail with reference FIGS. 3, 5 and 6.

Gate conductors including gate lines 121, storage electrode lines 131, and capacitive electrodes 136 are disposed on an insulating substrate 110 such as transparent glass or plastic.

The gate lines 121 transmit gate signals and extend substantially in a transverse direction. Each gate line 121 includes gate electrodes 124 projecting upward and an end portion 129 having a large area for contact with another layer or an external driving circuit. A gate driving circuit (not shown) for generating the gate signals may be mounted on a flexible printed circuit (FPC) film (not shown), which may be attached to the insulating substrate 110, directly mounted on the substrate 110, or integrated onto the insulating substrate 110. The gate lines 121 may extend to be electrically connected to a driving circuit that may be integrated on the insulating substrate 110.

The storage electrode lines 131 are supplied with a predetermined voltage and each of the storage electrode lines 131 includes a pair of stems 131*b* including lower stems 131*a*1 and upper stems 131*a*2 extending substantially parallel to the gate lines 121. Each of the storage electrode lines 131 is disposed between two adjacent gate lines 121, and the lower and the upper stems 131*a*1 and 131*a*2 are disposed close to lower and upper ones of the two adjacent gate lines 121, respectively. The lower and the upper stems 131*a*1 and 131*a*2 include lower and upper storage electrodes 137*a*1 and 137*a*2, respectively, which expand from the lower and upper stems 131*a*1 and 131*a*2 in both upward and downward directions. However, the storage electrode lines 131 may have various shapes and arrangements.

Each of the capacitive electrodes 136 is substantially rectangular in shape and extended parallel to the gate lines 121 and separated from the gate lines 121 and the storage electrode lines 131. Each of the capacitive electrodes 136 is disposed between a pair of the lower and upper storage electrodes 137*a*1 and 137*a*2 and it is substantially equidistant from the lower and the upper storage electrodes 137*a*1 and 137*a*2. Each of the capacitive electrodes 136 is substantially equidistant from the lower and upper ones of the adjacent two gate lines 121. Each of the capacitive electrodes 136 includes a funneled end portion that has oblique edges that diverge from each other to form about a 45-degree angle with respect to the gate lines 121.

The gate lines 121, the storage electrode lines 131 and the capacitive electrodes 136 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, the gate lines 121, the storage electrode lines 131 and the capacitive electrodes 136 may have a multi-layered structure including two conductive films (not shown) having different physical characteristics. A first of the two conductive films is made of, for example, low resistivity metal including Al containing metal, Ag containing metal, and Cu containing metal for reducing signal delay or voltage drop. A second of the two conductive films may be made of material such as, for example, Mo containing metal, Cr, Ta, or Ti, which has good physical, chemical, and electrical contact characteristics with other materials such as indium tin oxide (ITO) or indium zinc oxide (IZO). Good examples of a combination of the two conductive films include a lower Cr film and an upper Al (alloy) film and a lower Al (alloy) film and an upper Mo (alloy) film. However, the gate lines 121, the storage electrode lines 131 and the capacitive electrodes 136 may be made of various metals or conductors.

Lateral sides of the gate lines 121, the storage electrode lines 131 and the capacitive electrodes 136 are inclined relative to a surface of the insulating substrate 110, and an inclination angle of the lateral sides range from about 30 degrees to about 80 degrees.

A gate insulating layer 140 preferably made of silicon nitride (SiNx) or silicon oxide (SiOx) is disposed on the gate lines 121, the storage electrode lines 131 and the capacitive electrodes 136.

Semiconductor islands 154 preferably made of hydrogenated amorphous silicon (abbreviated to "a-Si") or polysilicon are disposed on the gate insulating layer 140. The semiconductor islands 154 are disposed on the gate electrodes 124 and include extensions covering edges of the gate lines 121. A plurality of other semiconductor islands (not shown) may be disposed on the storage electrode lines 131.

Ohmic contact islands 163 and 165 are disposed on the semiconductor stripes 154. The ohmic contact islands 163 and 165 are made, for example, of n+ hydrogenated a-Si heavily doped with n type impurity such as phosphorous or of silicide. The ohmic contact islands 163 and 165 are disposed in pairs on the semiconductor islands 154.

Lateral sides of the semiconductor islands 154 and the ohmic contact islands 163 and 165 are inclined relative to a surface of the insulating substrate 110, and inclination angles thereof are preferably in a range of about 30 degrees to about 80 degrees.

A plurality of data conductors including data lines 171 and drain electrodes 175 are disposed on the ohmic contact islands 163 and 165 and the gate insulating layer 140.

The data lines 171 transmit data signals and extend in a direction substantially perpendicular to a direction of extension of the gate lines 121 and the storage electrode lines 131. The data lines 171 also traverse the gate lines 121 and the storage electrode lines 131. Each data line 171 includes source electrodes 173 projecting toward the gate electrodes 124 and an end portion 179 having a large area for contact with another layer or an external driving circuit. A data driving circuit (not shown) for generating the data signals may be mounted on a FPC film (not shown), which may be attached to the insulating substrate 110, directly mounted on the insulating substrate 110, or integrated onto the insulating substrate 110. The data lines 171 may extend to be electrically connected to a driving circuit that may be integrated on the insulating substrate 110.

Each of the drain electrodes 175 is separated from the data lines 171 and includes an end portion disposed opposite to one of the source electrodes 173 with respect to one of the gate electrodes 124. The end portion is partly enclosed by a source electrode 173 that is curved in a U-shape.

Each drain electrode 175 further includes expansions 177 and 176 and a pair of interconnections 178a1 and 178a2. The expansions 177 and 176 include lower, upper and central expansions, respectively. The pair of interconnections 178a1 and 178a2 connect the lower, upper, and central expansions 177a1, 177a2, and 176. Each of the lower, upper, and central expansions 177a1, 177a2, and 176 are rectangular shaped and extended parallel to the gate lines 121. The interconnections 178a1 and 178a2 connect the lower, upper, and central expansions 177a1, 177a2, and 176 near left sides thereof and extend substantially parallel to the data lines 171.

The lower and upper expansions 177a1 and 177a2 overlap the lower and upper storage electrodes 137a1 and 137a2, respectively. The central expansion 176 overlaps the capacitive electrode 136 and is referred to as a "coupling electrode." The central expansion 176 has an opening 176H exposing a top surface of the gate insulating layer 140 near a left end portion and the opening 176H has nearly a same shape as the central expansion 136.

A gate electrode 124, a source electrode 173, and a drain electrode 175 along with a semiconductor island 154 form a TFT having a channel disposed in a portion of the semiconductor island 154 disposed between the source electrode 173 and the drain electrode 175.

The data lines 171 and the drain electrodes 175 are made of, for example, refractory metal such as Cr, Mo, Ta, Ti, or alloys thereof. However, they may have a multilayered structure including a refractory metal film (not shown) and a low resistivity film (not shown). Examples of the multi-layered structure include a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data lines 171 and the drain electrodes 175 may be made of various metals or conductors. FIG. 6 shows an example of the triple-layered structure including first, second and third data line layers 171q, 171p and 171r and first, second and third drain electrode layers 175q, 175p and 175r. Additionally, as shown in FIG. 6, the source electrode 173, the end portion 179 and the expansions 176 and 177 may have the multi-layered structure including first, second and third layers 173q, 173p and 173r, 179q, 179p and 179r, 176q, 176p and 176r, and 177q, 177p and 177r.

The data lines 171 and the drain electrodes 175 have inclined edge profiles, and inclination angles thereof range from about 30 degrees to about 80 degrees.

The ohmic contact islands 163 and 165 are interposed only between the underlying semiconductor islands 154 and the overlying data lines 171 and drain electrodes 175 and reduce a contact resistance between the semiconductor islands 154 and the data lines 171 and drain electrodes 175. Projections of the semiconductor islands 154 disposed on edges of the gate lines 121 smooth a profile of a surface of the semiconductor islands 154 to prevent disconnection of the data lines 171. The projections of the semiconductor islands 154 include some exposed portions, which are not covered with the data lines 171 and the drain electrodes 175, such as portions located between the source electrodes 173 and the drain electrodes 175.

A passivation layer 180 is disposed on the data lines 171 and the drain electrodes 175, and the exposed portions of the semiconductor islands 154. The passivation layer 180 is made of, for example, an inorganic or organic insulator and the passivation layer 180 may have a flat surface. Examples of an inorganic insulator include silicon nitride and silicon oxide. An organic insulator may have photosensitivity and, for example, has a dielectric constant less than about 4.0. The passivation layer 180 may include a lower film of inorganic insulator and an upper film of organic insulator such that the passivation layer 180 has excellent insulating characteristics of the organic insulator while preventing the exposed portions of the semiconductor islands 154 from being damaged by the organic insulator.

The passivation layer 180 has contact holes 182 exposing the end portions 179 of the data lines 171 and contact holes 185 exposing the lower and the upper expansions 177a1 and 177a2 of the drain electrodes 175. The passivation layer 180 and the gate insulating layer 140 have contact holes 181 exposing the end portions 129 of the gate lines 121 and contact holes 186 penetrating the openings 176H and exposing end portions of the capacitive electrodes 136.

The pixel electrodes 190, a shielding electrode 88, and contact assistants 81 and 82 are disposed on the passivation layer 180. The pixel electrodes 190, the shielding electrode 88, and the contact assistants 81 and 82 are made of, for example, a transparent conductor such as ITO or IZO or a reflective conductor such as Ag, Al, Cr, or alloys thereof.

Each pixel electrode 190 is substantially rectangular in shape and has chamfered corners and chamfered edges that make an angle of about 45 degrees with respect to the gate lines 121. The pixel electrodes 190 overlap the gate lines 121 to increase an aperture ratio.

Each of the pixel electrodes 190 has lower and upper gaps 93a and 93b that divide the pixel electrode 190 into lower, upper, and central sub-pixel electrodes 190a1, 190a2 and 190b. The lower and the upper gaps 93a and 93b obliquely extend from a left edge to a right edge of the pixel electrode 190 such that the central sub-pixel electrode 190b is an isosceles trapezoid rotated by a right angle and the lower and upper sub-pixel electrodes 190a1 and 190a2 are right-angled trapezoids rotated by a right angle. The lower and the upper gaps 93a and 93b make an angle of about 45 degrees with respect to the gate lines 121 and are perpendicular to each other.

The lower and the upper sub-pixel electrodes 190a1 and 190a2 are connected to the lower and the upper expansions 177a1 and 177a2 of the drain electrodes 175 through contact holes 185.

The central sub-pixel electrode 190b is connected to the capacitive electrode 136 through the contact hole 186 and overlaps the central expansion 176. The central sub-pixel electrode 190b, the capacitive electrode 136, and the central expansion 176 form a "coupling capacitor."

The central sub-pixel electrode 190b has central cutouts 91 and 92, the lower sub-pixel electrode 190a1 has lower cutouts 94a and 95a, and the upper sub-pixel electrode 190a2 has upper cutouts 94b and 95b. The central, lower, and upper cutouts 91, 92 and 94a-95b partition the central, lower and upper sub-pixel electrodes 190b, 190a1 and 190a2 into a plurality of partitions. The pixel electrode 190 having the central, lower, and upper cutouts 91, 92 and 94a-95b and the lower and upper gaps 93a and 93b (also referred to as cutouts hereinafter) substantially have an inversion symmetry with respect to the capacitive electrode 136.

Each of the lower and the upper cutouts 94a-95b obliquely extends approximately from a left corner, a lower edge, or an upper edge of the pixel electrode 190 approximately to a right edge of the pixel electrode 190. The lower and the upper cutouts 94a-95b make an angle of about 45 degrees with respect to the gate lines 121, and extend substantially perpendicular to each other.

Each of the center cutouts 91 and 92 includes a transverse portion and a pair of oblique portions connected thereto. The transverse portion shortly extends along the capacitive electrode 136, and the oblique portions obliquely extend from the transverse portion toward the left edge of the pixel electrode 190 parallel to the lower and the upper cutouts 94a-95b, respectively. The center cutout 91 overlaps the funneled end portion of the coupling electrode 176 and the capacitive electrode 136.

A number of cutouts or number of partitions is varied depending on design factors such as size of the pixel electrode 190, a ratio of transverse edges and longitudinal edges of the pixel electrode 190, type and characteristics of the liquid crystal layer 3, and so on.

A shielding electrode 88 is supplied with the common voltage and it includes longitudinal portions extending along the data lines 171 and transverse portions extending along the gate lines 121 to connect adjacent longitudinal portions. The longitudinal portions fully cover the data lines 171, while each of the transverse portions lies within a boundary of a gate line 121.

The shielding electrode 88 blocks electromagnetic interference between the data lines 171 and the pixel electrodes 190 and between the data lines 171 and the common electrode 270 to reduce distortion of a voltage of the pixel electrodes 190 and a signal delay of the data voltages carried by the data lines 171.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance adhesion between the end portions 129 and 179 and external devices.

A description of the upper panel 200, also called the common electrode panel follows with reference to FIGS. 2-4 and 6.

A light blocking member 220 referred to as a black matrix for preventing light leakage is disposed on an insulating substrate 210 such as transparent glass or plastic. The light blocking member 220 includes a rectilinear portion facing the data lines 171 on the lower panel 100 and widened portions facing the TFTs on the lower panel 100. Alternatively, the light blocking member 220 may include openings that face the pixel electrodes 190 and the light blocking member 220 may have substantially a same planar shape as the pixel electrodes 190.

The color filters 230 are also disposed on the insulating substrate 210 and the color filters 230 are disposed substantially in areas enclosed by the light blocking member 220. The color filters 230 may extend substantially along the longitudinal direction along the pixel electrodes 190. The color filters 230 may represent one of the primary colors such as the red, green and blue colors.

An overcoat 250 is disposed on the color filters 230 and the light blocking member 220. The overcoat 250 is preferably made of (organic) insulator and the overcoat 250 prevents the color filters 230 from being exposed and provides a flat surface.

The common electrode 270 is disposed on the overcoat 250. The common electrode 270 is made of, for example, transparent conductive material such as ITO and IZO and has a plurality of cutouts 71, 72, 73, 74a, 74b, 75a, 75b, 76a and 76b.

The cutouts 71-76b face the pixel electrode 190 and include center cutouts 71, 72, and 73, lower cutouts 74a, 75a and 76a and upper cutouts 74b, 75b and 76b. The cutout 71 is disposed near the contact hole 186 and each of the cutouts 72-76b is disposed between adjacent ones of the central, lower, and upper cutouts 91, 92 and 94a-95b and the lower and upper gaps 93a and 93b of the pixel electrode 190 or between lower and upper cutouts 95a or 95b and a chamfered edge of the pixel electrode 190. Each of the cutouts 71-76b has at least an oblique portion extending parallel to the lower cutouts 94a and 95a and the lower gap 93a or the upper cutouts 94b and 95b and the upper gap 93b of the pixel electrode 190. Each of the oblique portions of the cutouts 72-75b has a depressed notch and the cutouts 71-76b have substantially an inversion symmetry with respect to the capacitive electrode 136.

Each of the lower and the upper cutouts 74a-76b includes an oblique portion and a pair of transverse and longitudinal portions or a pair of longitudinal portions. The oblique portion extends approximately from a left edge, a lower edge, or an upper edge of the pixel electrode 190 approximately to a right edge of the pixel electrode 190. The transverse and longitudinal portions extend from respective ends of the oblique portion along edges of the pixel electrode 190, overlapping the edges of the pixel electrode 190, and making obtuse angles with the oblique portion.

Each of the center cutouts 71 and 72 includes a central transverse portion, a pair of oblique portions, and a pair of terminal longitudinal portions and the center cutout 73 includes a pair of oblique portions and a pair of terminal longitudinal portions. The central transverse portion is disposed near the left edge or a center of the pixel electrode 190 and extends along the capacitive electrode 136. The oblique portions extend from an end of the central transverse portion or approximately from a center of the right edge of the pixel electrode 190, approximately to the left edge of the pixel electrode. The oblique portions of the cutouts 71 and 72 make oblique angles with the central transverse portion. The terminal longitudinal portions extend from ends of respective oblique portions along the left edge of the pixel electrode 190, overlapping the left edge of the pixel electrode 190, and making obtuse angles with respective oblique portions.

A number of the cutouts 71-76b may be also varied depending on the design factors, and the light blocking member 220 may overlap the cutouts 71-76b to block light leakage through the cutouts 71-76b.

Alignment layers 11 and 21 that may be homeotropic are coated on inner surfaces of the lower and upper panels 100 and 200, respectively, and polarizers 12 and 22 are provided on outer surfaces of the lower and upper panels 100 and 200, respectively, so that polarization axes of the polarizers 12 and 22 may be crossed and one of the polarization axes may be parallel to the gate lines 121. One of the polarizers 12 and 22 may be omitted when the LCD device is a reflective LCD device.

The LCD device may further include at least one retardation film (not shown) for compensating a retardation of the LC layer 3. The retardation film has birefringence and gives a retardation opposite to that given by the LC layer 3.

The LCD device may further include a backlight unit (not shown) supplying light to the LC layer 3 through the polarizers 12 and 22, the retardation film, and the lower and upper panels 100 and 200.

In an exemplary embodiment the LC layer 3 has negative dielectric anisotropy and is subjected to a vertical alignment so that the LC molecules in the LC layer 3 are aligned such that long axes of the LC molecules are substantially vertical to surfaces of the lower and upper panels 100 and 200 in absence of an electric field. Accordingly, incident light cannot pass the polarizers 12 and 22.

Opaque members such as the storage electrode lines 131, the capacitive electrodes 136, and the lower, upper, and central expansions 177a1, 177a2 and 176 and the interconnections 178a1 and 178a2 of the drain electrodes 175, and trans-parent members such as the pixel electrodes 190 having the cutouts 91-95b and 71-76b are symmetrically arranged with respect to the capacitive electrodes 136 that are equidistant from adjacent gate lines 121. At this time, since the interconnections 178a1 and 178a2 are disposed near the edges of the pixel electrodes 190, the interconnections 178a1 and 178a2 do not decrease light transmissive areas, but rather block texture generated near the light transmissive areas.

Shapes and arrangements of the cutouts 91-95b and 71-76b for determining tilt directions of the LC molecules may be modified and at least one of the cutouts 91-95b and 71-76b can be substituted with protrusions (not shown) or depressions (not shown).

The protrusions are made of, for example, organic or inorganic material and disposed on or under the pixel and common electrodes 190 or 270.

A repairing device and a repairing method for an LCD device having a structure described above will now be described with reference to FIGS. 7-17.

Figure 7:
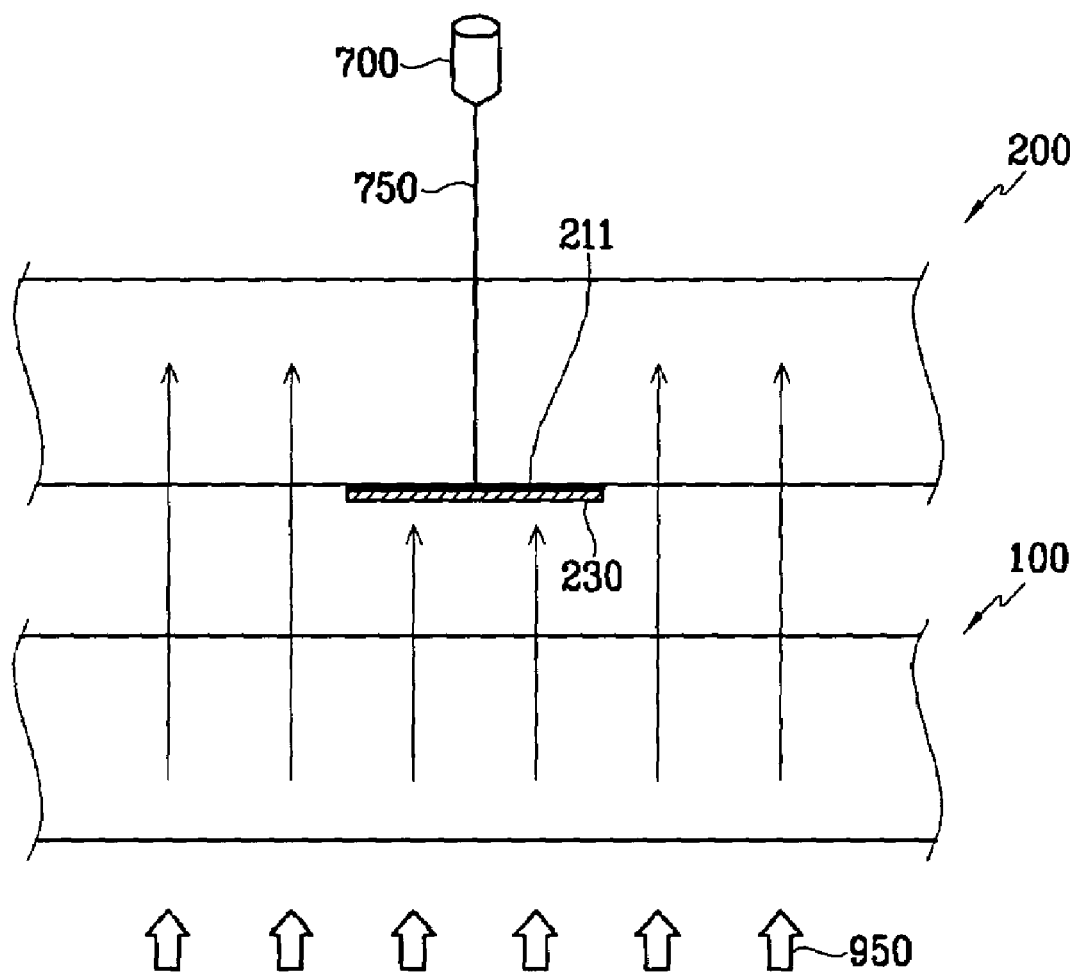
FIG. 7 is a schematic diagram to illustrate a repairing scheme of an LCD device according to an exemplary embodiment of the present invention.

Referring FIG. 7, the lower panel 100, the upper panel 200 and the color filter 230 of FIG. 2 are shown. Laser beam 750 emitted from laser equipment 700 which is located above the upper panel 200 is focused on a border 211 of the color filter 230 and the upper panel 200 and then is illuminated onto the border 211. Thus, a transmittance of the color filter 230 is varied to block light 950 from the source light unit 910.

The laser equipment 700 is located external to the LCD device and illuminates the laser beam 750 on the color filter 230. In other words, the laser beam 750 must transit through the upper panel 200 and vary the transmittance of the color filter 230 without damaging remaining portions of the color filter 230 except for the border 211 of the color filter 230. Thus, it is required to find laser equipment 700 having such a laser beam 750, which will be described in detail referring to FIGS. 8-11.

Figure 8:
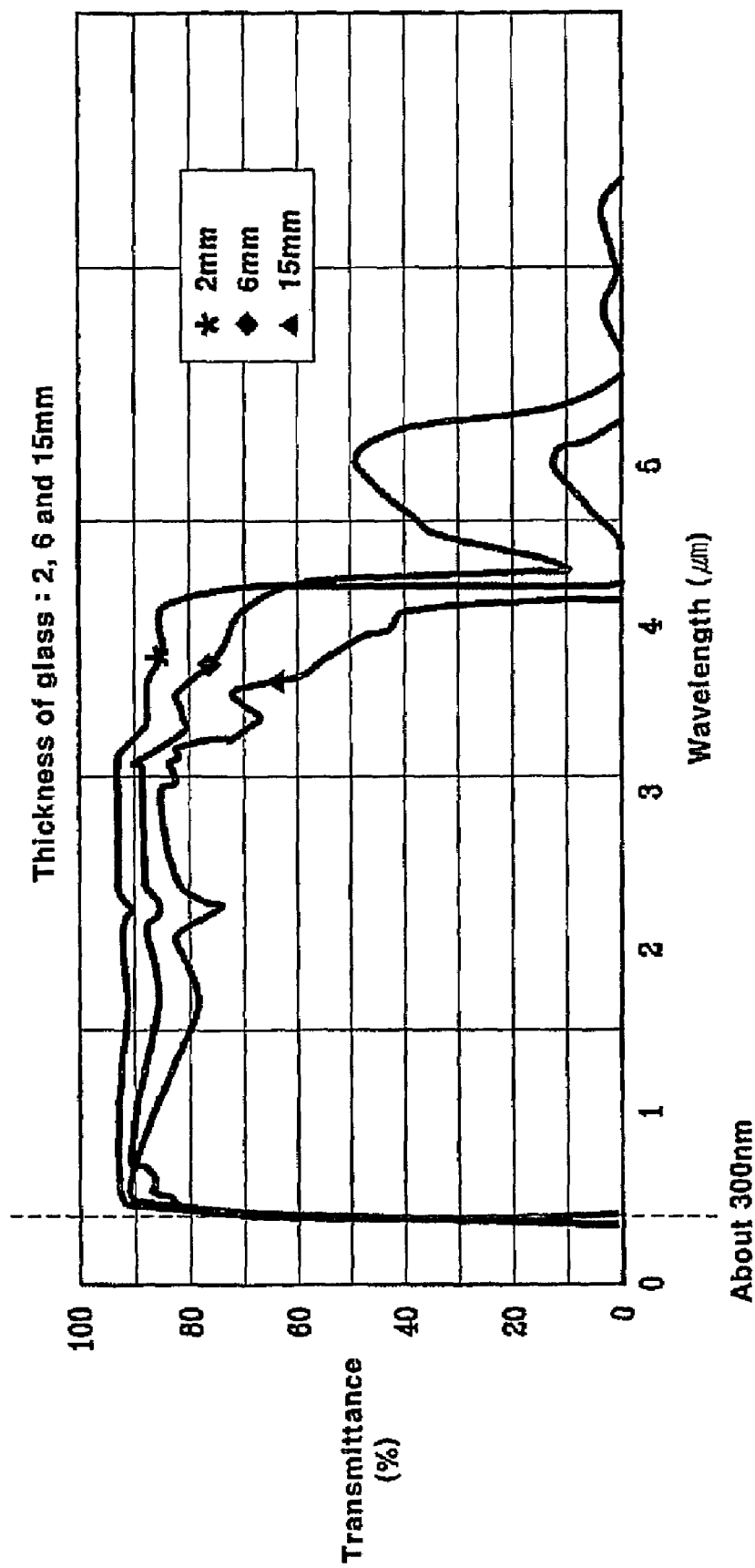
FIG. 8 is a graph to illustrate conditions for selecting laser equipment used for repairing an LCD device according to an exemplary embodiment of the present invention.
Figure 9:
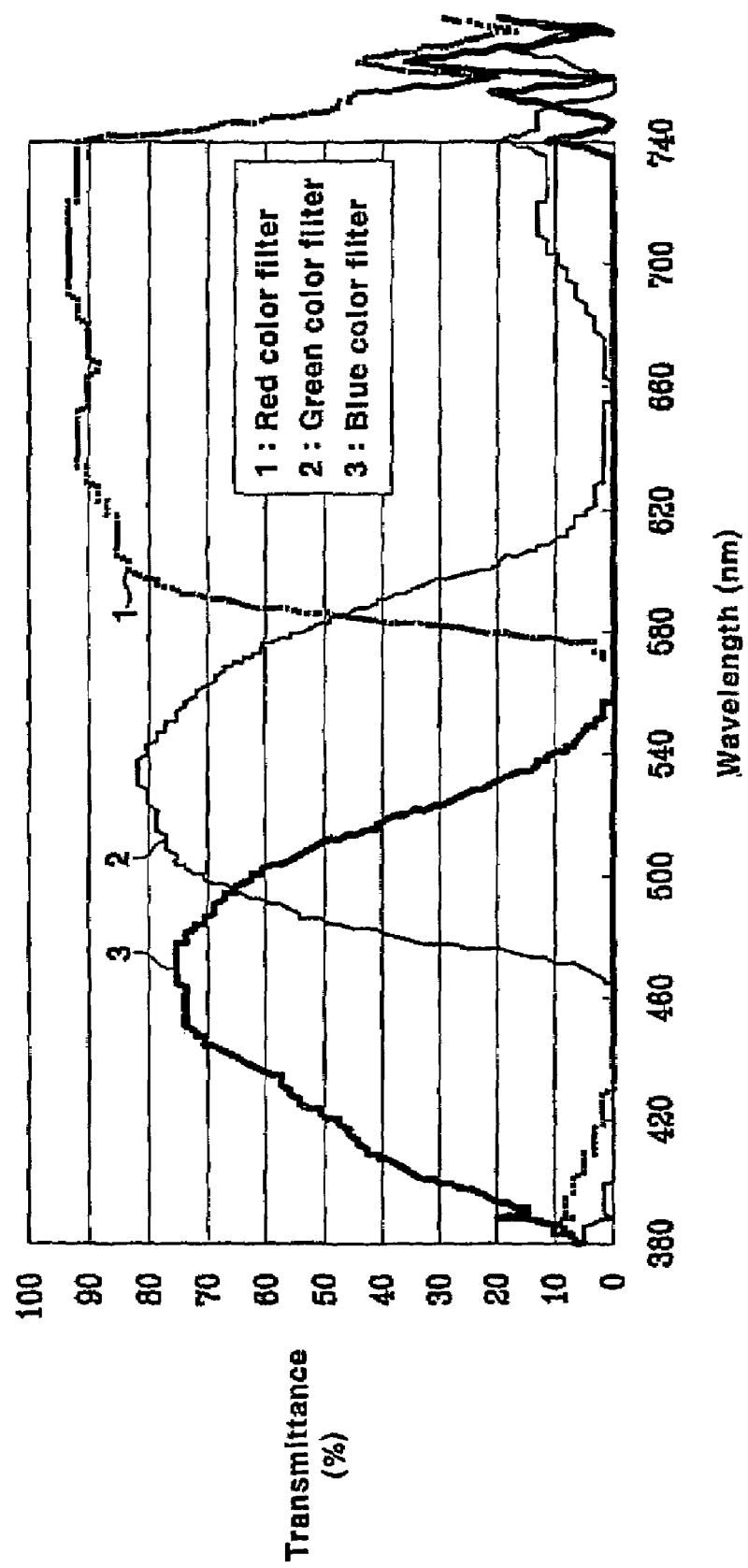
FIG. 9 is a graph to illustrate a transmittance characteristic for color filters.
Figure 10:
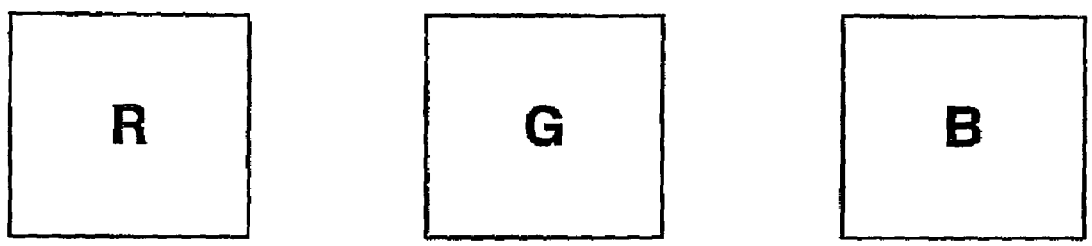
FIG. 10 shows test material used for an experiment according to an exemplary embodiment of the present invention.
Figure 11:
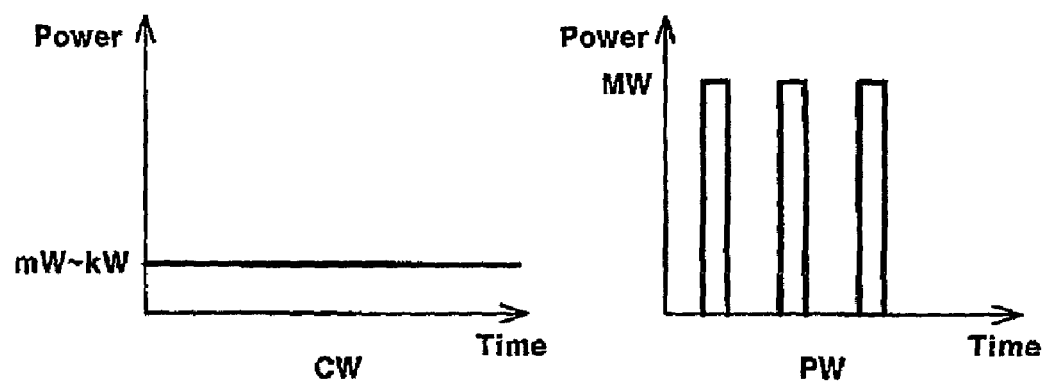
FIG. 11 shows graphs to illustrate different characteristics of a laser beam for selecting laser equipment used for repairing an LCD device according to an exemplary embodiment of the present invention.

FIG. 8 is a graph to illustrate conditions for selecting laser equipment used for repairing an LCD device according to an exemplary embodiment of the present invention. FIG. 9 is a graph to illustrate a transmittance characteristic for each color filter. FIG. 10 shows test material used for an experiment according to an exemplary embodiment of the present invention. FIG. 11 shows graphs to illustrate different characteristics of a laser beam for selecting laser equipment used for repairing an LCD device according to an exemplary embodiment of the present invention.

FIG. 8 is a graph to show results of measuring a transmittance of test material made of glass and having three different thicknesses varying a wavelength of a laser beam 750. A horizontal axis represents a wavelength of the laser beam having units of µm, and a vertical axis represents the transmittance by percentage.

The test material is glass having a brand name BOROFLOAT and thicknesses of the test material are 2 mm, 6 mm and 15 mm.

As shown in FIG. 8, when the wavelength of the laser beam is more than about 300 nm, i.e., 0.3 µm, for example, more than 250 nm, the laser beam is transmitted regardless of the thickness of the glass.

FIG. 9 is a graph to represent a spectral characteristic for each color filter 230. The horizontal axis represents a wavelength of the laser beam having units of nm and the vertical axis represents the transmittance by percentage.

The color filter 230 preferably absorbs all energy of the laser beam to denaturalize the color filter 230. Thus, a wavelength in which the laser beam is not transmitted but absorbed in the color filter 230 is preferable. Absorbing the laser beam in the color filter 230 prevents the laser beam from damaging signal lines including the data lines 171.

Denaturalization of the color filter 230 means that the laser beam is illuminated onto the color filter 230 to change components or characteristics of the color filter 230, thereby absorbing light from the light source unit 910 and not transmitting the light. Denaturalization also means that the light from the light source unit 910 transits through the color filter 230 before the color filter 230 is denaturalized.

Each of the red, the green and the blue color filters performs absorption and transmittance in a range of different wavelengths, and thus the laser beam having a different wavelength for each color filer 230 may be used. Alternatively, a laser beam having a wavelength in which absorption is performed regardless of a color of the color filter 230 may be used, which provides an advantage in terms of working time and ease of work.

As shown in FIG. 9, it is known that a wavelength having the transmittance of zero, that is, a wavelength that is capable of absorbing almost all energy is less than about 380 nm or more than about 740 nm. However, it has been verified in practical experiments that energy is absorbed at a wavelength of 532 nm as well. Thus, laser equipment is selected responsive to information about the wavelength, which will be described.

FIG. 10 shows a separately manufactured test material for a color filter, which is to form the color filter 230 including red R, green G, and blue B color filters on the upper panel 200, that is, to remove the polarizer 22, the overcoat 250, the common electrode 270 and the alignment layer 21.

Laser equipment recently used has two optical characteristics such as a continuous wave mode and a pulse wave mode, and the left graph shows an intensity characteristic for the continuous mode and the right graph shows an intensity characteristic for the pulse wave mode graphs in FIG. 11.

The continuous wave (CW) mode laser equipment continuously generates laser beam having power that may range from several mW to several kW, and the pulse wave (PW) mode laser equipment periodically generates pulses having several MW at a constant time interval.

TABLE 1 represents experimental conditions for many available laser equipment types.

TABLE 1

| Laser Equipment | Wavelength (nm) | Mode |
| --- | --- | --- |
| He—Cd | 543 | CW |
| NdYAG | 355 | PW |
| Ar | 488 | CW |
| NdYAG | 1064 | CW |

The laser equipment types are classified by a source forming the laser beam, which is, a laser source.

As a result of illuminating the laser equipments shown in TABLE 1 on test material for a color filter shown in FIG. 10, for two laser equipment types He—Cd and Ar, the laser beam is illuminated thereon for more than five minutes, but the denaturalization does not occur. For CW mode NdYAG type laser equipment, the test material punctures or the denaturalization does not occur depending on an intensity of the laser beam. However, for PW mode NdYAG type laser equipment, the test material is denaturalized, and a degree of denaturalization can be varied in response to intensity of the laser beam, or a number of pulses, i.e., a frequency of the laser beam.

Accordingly, one can determine that laser equipment having the PW mode is preferably used rather than laser equipment having the CW mode, and the wavelength of the laser beam is used, for example, in a range from 250 nm to 380 nm.

Of course, even laser equipment types having the CW mode may be used when characteristics, for example, the laser beam, the wavelength or the intensity are varied unlike experimental conditions described above. The above experimental conditions are examples, and thus other laser equipment types, and the CW mode or the PW mode having other wavelengths are not completely excluded.

Several schemes for denaturalizing the color filter 230 using the NdYAG type laser equipment having a wavelength of 355 nm and the PW mode will now be described in detail.

Figure 12:
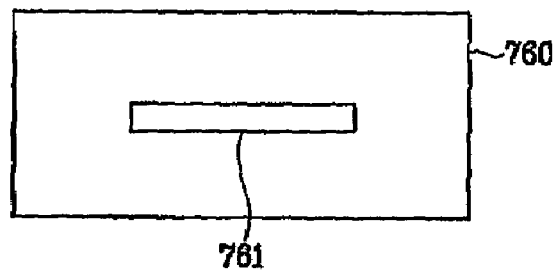
FIG. 12 shows a slit used for a repairing device of an LCD device according to an exemplary embodiment of the present invention.
Figure 13:
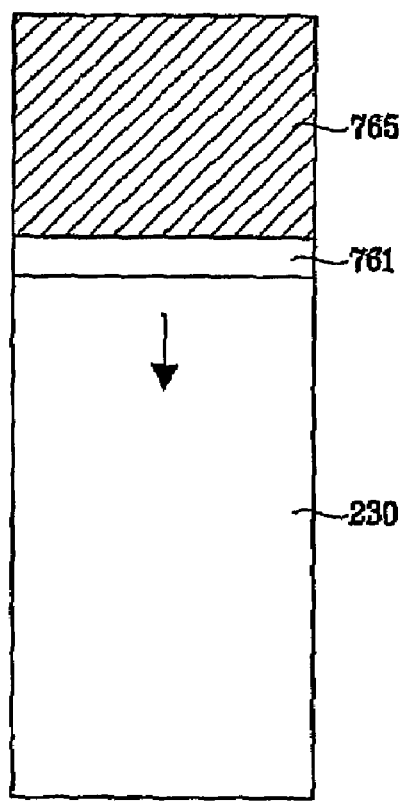
FIG. 13 shows a scheme to illuminate a laser beam onto a color filter using a repairing device of an LCD device according to an exemplary embodiment of the present invention.

FIG. 12 shows a slit used for a repairing device of an LCD device according to an exemplary embodiment of the present invention, and FIG. 13 shows a scheme to illuminate laser beam on a color filter using a repairing device of an LCD device according to an exemplary embodiment of the present invention.

A slit 760 assists in fixing a focus of the laser beam on a pixel, and is used when the focus of the laser beam is larger than the pixel. The slit 760 may include a transmissive area 761 and a light blocking area surrounding the transmissive area 761 like a slit mask used for a manufacturing process of the LCD device. A size of the transmissive area 761 may be adjusted to be suitable for a size of the pixel. Additionally, the transmissive area 761 may be a transparent substrate or an opening, which is an empty space.

As shown in FIG. 13, in a color filter 230 having a defect, the laser beam is illuminated through the transmissive area 761 in a direction of an arrow from a top to a bottom thereof. A region on which the laser beam is illuminated has a denaturalized portion 765, and thus the color filter 230 is varied in a transmissive characteristic due to the denaturalization to absorb light from the light source unit 910.

At this time, a pulse frequency of the laser beam is less than about 55 Hz in which bubbles are not generated in the LC layer 3. For frequencies greater than about 55 Hz, the color filter 230 is demolished to flow into the LC layer 3, thereby generating bubbles. As an example of the pulse frequency, the pulse frequency may be about 50 Hz.

Additionally, the laser beam is illuminated onto the color filter 230 having the polarizer 22 either attached or unattached to the upper panel 200. Since the polarizer 22 functions to cause an illumination area or intensity of the laser beam to be changed, illumination of the laser beam onto the color filter 230 through the polarizer 22 must reflect a factor changed by the polarizer 22. For example, if the laser beam is illuminated into a color filter 230 having the polarizer 22 attached, a wavelength of the laser beam may be more than 380 nm.

Figure 14:
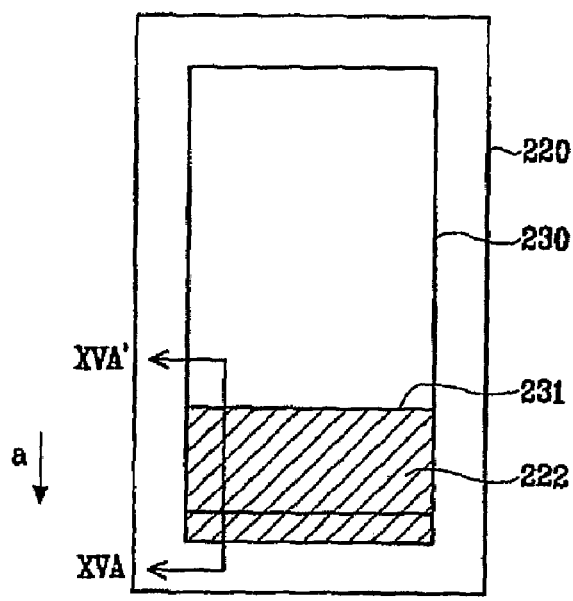
FIG. 14 shows a scheme to illuminate a laser beam onto a color filter using a repairing device of an LCD device according to another exemplary embodiment of the present invention.
Figure 15A:
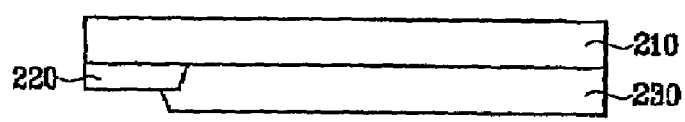
FIGS. 15A-15C show a principle of illuminating a laser beam onto a color filter according to the scheme shown in FIG. 14.
Figure 15B:
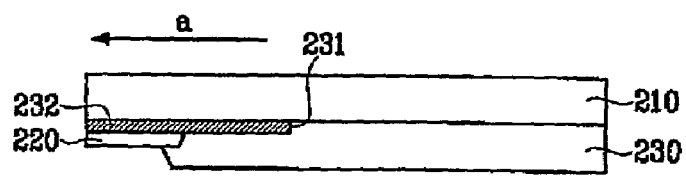
Figure 15C:
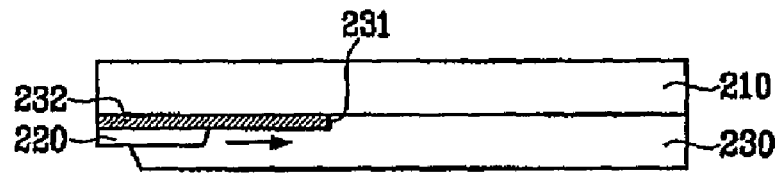

FIG. 14 shows a scheme to illuminate a laser beam into a color filter using a repairing device of an LCD device according to another embodiment of the present invention, and FIGS. 15A-15C show a principle of illuminating a laser beam into a color filter according to the scheme shown in FIG. 14.

FIGS. 15A-15C are sectional views of the color filter 230 shown in FIG. 14 taken along line XVA-XVA'.

The color filter 230 and the light blocking member 220 encompassing the color filter 230 are shown in FIGS. 14-15C, and reference numeral 231 represents a start line of illuminating the laser beam.

The laser beam is illuminated from the start line 231 to a portion of the light blocking member 220 in a direction of arrow (a). Thus, the light blocking member 220 diffuses into an illumination region 222 that is illuminated with the laser beam. However, the laser beam is operated at an intensity level that does not cause denaturalization. Such diffusion obtains an identical effect to the denaturalization of the color filter 230. The intensity of the laser beam may be varied by adjusting power or pulse frequency thereof.

When the laser beam is illuminated, respective components comprising the color filter 230 and the light blocking member 220 are decomposed to diffuse into a space generated by decomposition of the color filter 230 in the arrow (a) direction in a state prior to the denaturalization of the color filter 230. Thus, the light blocking member 220 blocks light from the light source unit 910 to obtain a same effect as the denaturalization of the color filter 230. In such a case, the light blocking member 220 is made of, for example, organic material.

FIGS. 16-18C show schemes to illuminate a laser beam onto a color filter according to other exemplary embodiments of the present invention.

Figure 16:
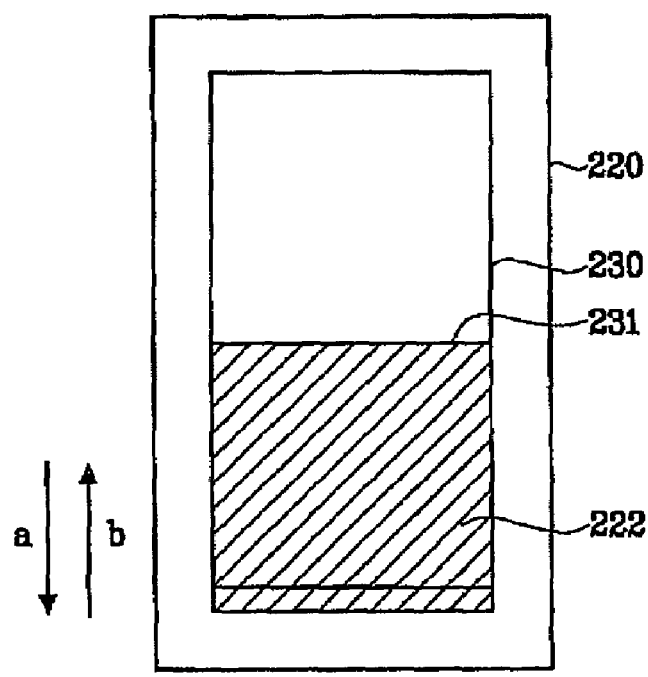
FIGS. 16, 17, and 18A-18C show schemes to illuminate a laser beam onto a color filter according to other exemplary embodiments of the present invention.

As shown in FIG. 16, the laser beam is first illuminated in the direction of the arrow (a), and successively, the laser beam is illuminated in an opposite direction indicated by arrow (b). The scheme shown in FIG. 16 enlarges the diffusion area 222 more than that shown in FIG. 14 by pushing the light blocking member 220 diffused by the illumination thereof in the direction of the arrow (a) upward and then in the opposite direction of the arrow (b).

Figure 17:
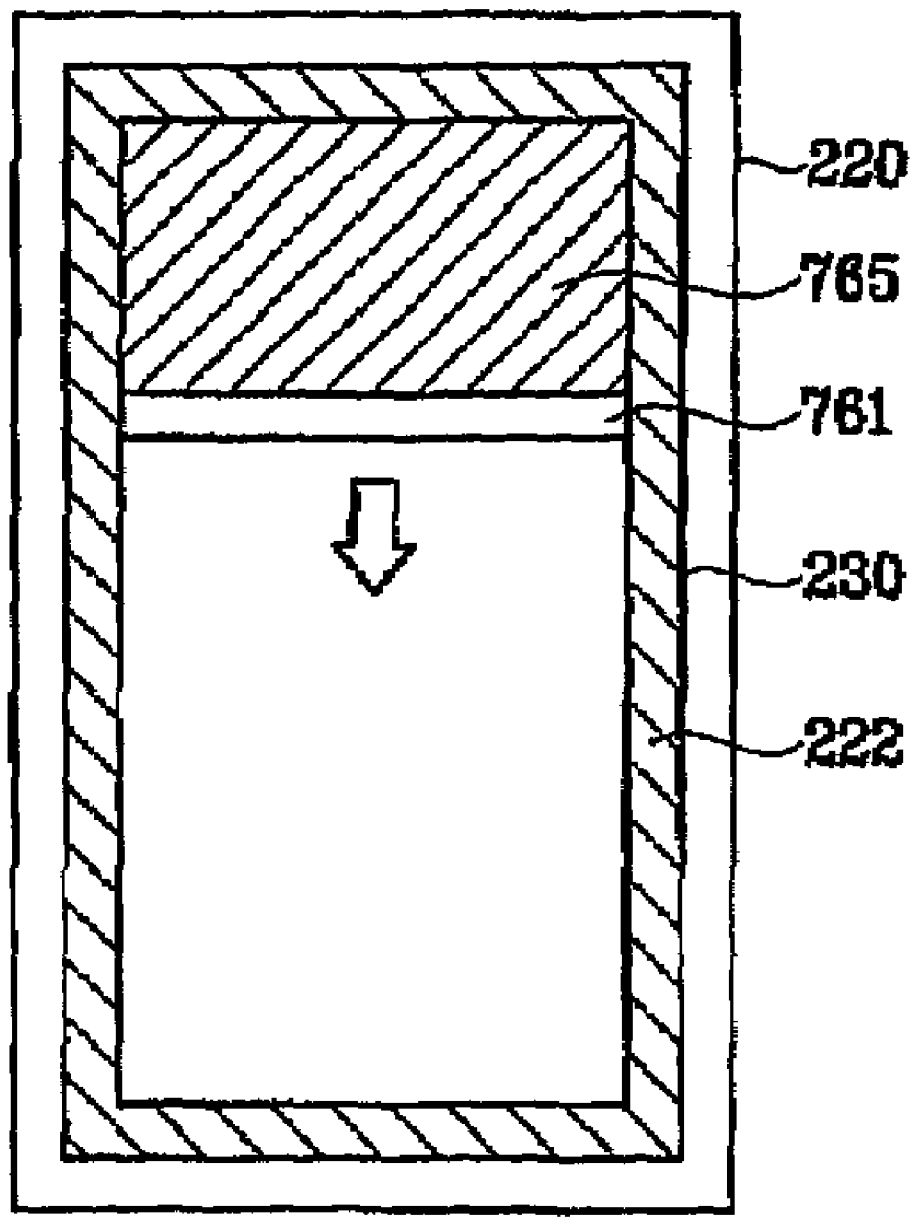

A scheme shown in FIG. 17 combines that shown in FIG. 13 and that shown in FIG. 14 or 15, in that the laser beam is illuminated onto a portion of the color filter 230 through the transmissive area 761 having a smaller width than the color filter 230 and the light blocking member 220 is diffused into an edge thereof, that is, an area adjacent to the light blocking member 220.

At this time, the laser beam having intensity insufficient to cause the denaturalization is first illuminated onto an area including the light blocking member 220 together with the color filter 230, and then the laser beam having intensity sufficient to cause the denaturalization is illuminated into the color filter 230 only through the transmissive area 761. Then, the diffusion area 222 is generated in the border of the color filter 230 and the light blocking member 220 and the denaturalized portion 765 are generated in an inner side of the color filter 230.

In such a case, the intensity of the laser beam causing the denaturalization of the color filter 230 may demolish the light blocking member 220, but some margin exists due to a smaller width than the color filter 230 and thus prevents the LC layer 3 from being polluted due to demolition of the light blocking member 220.

Figure 18A:
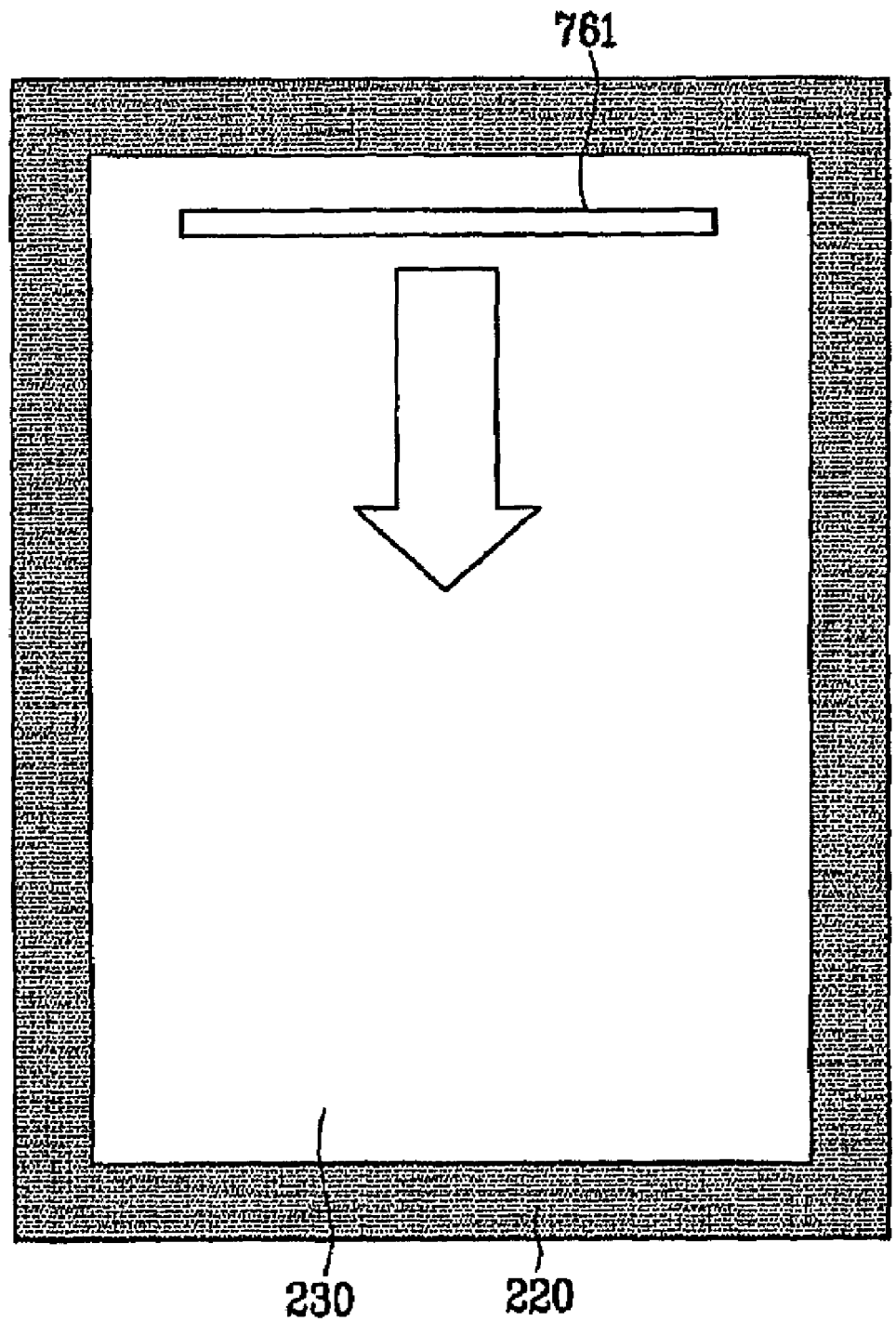
Figure 18B:
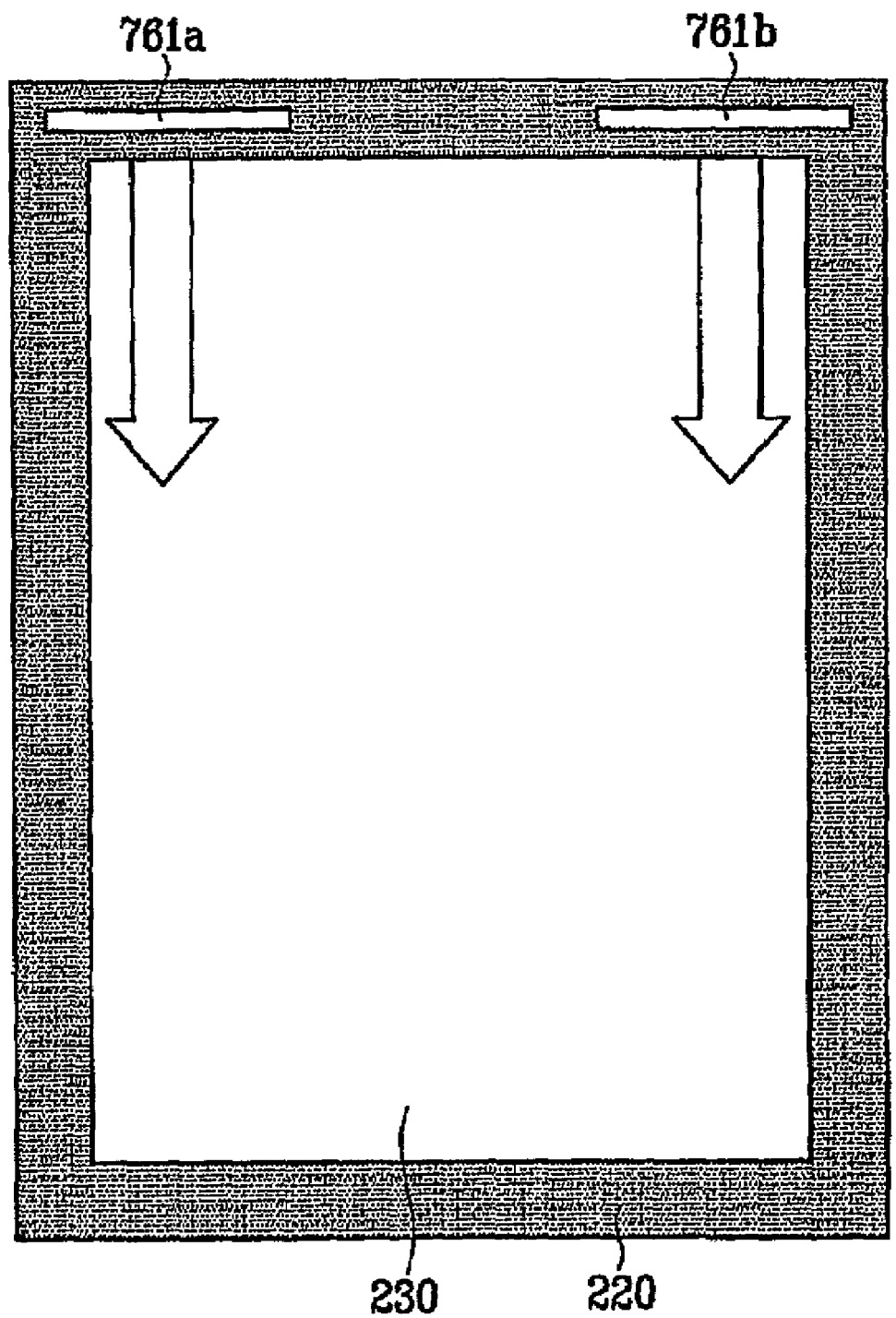
Figure 18C:
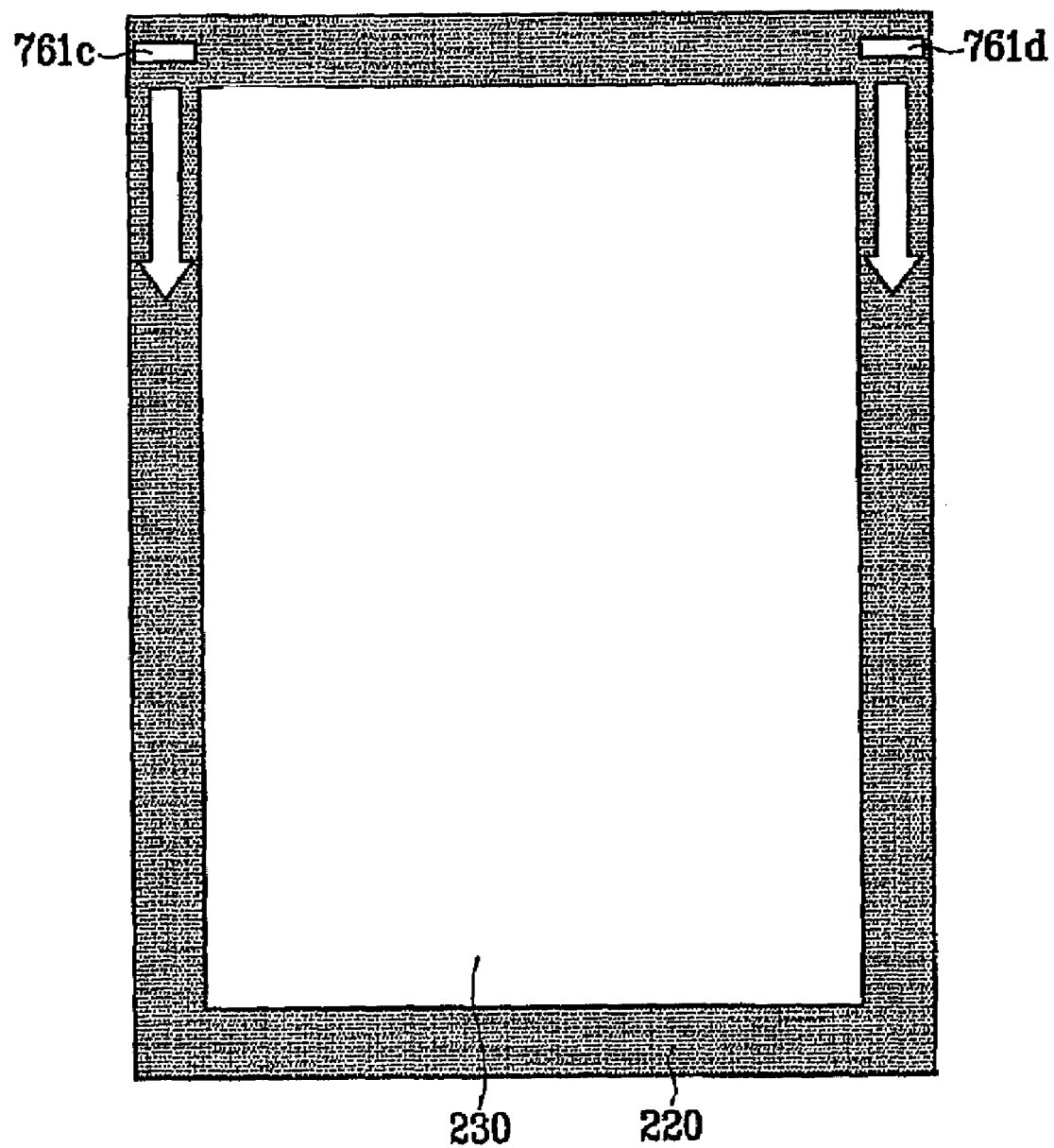

FIGS. 18A-18C show schemes to illuminate a laser beam onto a color filter according to other exemplary embodiments of the present invention, and are examples to perform the repairing by only diffusion of the light blocking member 220.

First, referring to FIG. 18A, the laser beam is illuminated in a direction of an arrow through the transmissive area 761 having a smaller width than the color filter 230 to form a space as described above. In other words, the intensity of the laser beam is not sufficient to cause the denaturalization of the color filter 230.

Subsequently, as shown in FIG. 18B, the laser beam is illuminated to an area including a portion of the color filter 230 and a portion of the light blocking member 220 with respect to the border therebetween through transmissive areas 761a and 761b. A width of each of the transmissive areas 761a and 761b may be equal to or smaller than a width of the transmissive area 761 shown in FIG. 18A, and an area onto which the laser beam is illuminated through the transmissive area 761 preferably overlaps areas to which the laser beam is illuminated through the transmissive areas 761a and 761b.

Finally, as shown in FIG. 18C, the laser beam is illuminated onto the light blocking member 220 located at both sides of the color filter 230 through transmissive areas 761c and 761d having widths almost equal to a width of side portions of the light blocking member 220. Thus, the light blocking member 220 is diffused from both sides of the color filter 230 to the inner side of the color filter 230 to be entirely diffused. The color filter 230 having the diffusion area blocks light from the light source unit 910.

Meanwhile, although an LCD device has been described in exemplary embodiments of the present invention, the present invention may be employed in any display devices using a color filter. For example, a white organic light emitting diode display device and other display devices including a color filter. In other words, the present invention can be employed to every display devices in which light is provided for the color filter, and intensity of the light after or before transmitting the color filter can be varied for users to recognize colors or a variety of grays.

As described above, laser equipment having a proper pulse frequency and wavelength is selected, and then use of an illumination scheme or a diffusion scheme using slits or both the illumination scheme and the diffusion scheme can repair a defected pixel effectively.

While the present invention has been described in detail with reference to exemplary embodiments, it is to be understood that the invention is not limited to the disclosed embodiments, but, on the contrary, is intended to cover various modifications and equivalent arrangements included within the sprit and scope of the appended claims.

What is claimed is:

1. A repairing method for a display device including a substrate and a color filter disposed on the substrate, the repairing method comprising:
    testing the display device;
    locating laser equipment above the display device;
    adjusting a focus of a laser beam illuminated from the laser equipment; and
    illuminating the laser beam onto the color filter,
    wherein a wavelength of the laser beam is greater than about 250 nm, and the illuminating the laser beam onto the color filter comprises sequentially illuminating the laser beam from an edge of a first surface facing the substrate in a first direction and then in a second direction that is opposite to the first direction through the transmissive area.

2. The repairing method of claim 1, wherein the color filter includes the first surface facing the substrate and a second surface disposed opposite to the first surface, and
    wherein the adjusting the focus of the laser beam comprises:
    illuminating the laser beam through a slit having a transmissive area and a light blocking area; and
    focusing the laser beam on the first substrate of the color filter.

3. The repairing method of claim 2, wherein the laser equipment has a pulse wave mode.

4. The repairing method of claim 3, wherein a range of the wavelength is one of less than about 380 nm and greater than about 740 nm.

5. The repairing method of claim 4, wherein a laser source of the laser equipment is an NdYAG.

6. The repairing method of claim 5, wherein the laser beam is illuminated passing through the substrate.

7. The repairing method of claim 1, wherein the display device further includes a polarizer attached to outer side of the substrate, and wherein the laser beam is illuminated passing through the polarizer.

8. The repairing method of claim 7, wherein a wavelength of the laser beam is greater than about 380 nm.

9. The repairing method of claim 1, wherein a pulse frequency of the laser beam is less than about 55 Hz.

10. The repairing method of claim 9, wherein the display device fun her includes a light source unit providing light to the color filter, and
wherein a transmittance of the color filters is varied in response to the laser beam being illuminated onto the color filter.

11. The repairing method of claim 10, wherein the color filter illuminated with the laser beam absorbs the light from the light source unit.

12. The repairing method of claim 1, wherein the adjusting the focus of the laser beam comprises:
illuminating the laser beam through a slit having a transmissive area and a light blocking area, a width of the transmissive area of the slit being substantially identical to a width of the color filter.

13. The repairing method of claim 1, wherein the display device further includes a light blocking member surrounding the color filter, and the light blocking member is made of organic material.

14. The repairing method of claim 13, wherein the illuminating the laser beam to the color filter comprises illuminating the laser beam from a middle of the color filter to a portion of the light blocking member.

15. The repairing method of claim 14, wherein an intensity of the laser beam is not sufficient to cause the color filter to be denaturalized.

16. The repairing method of claim 15, wherein the color filter has a diffusion area diffusing the light blocking member.

17. The repairing method of claim 13, wherein the illuminating the laser beam onto the color filter further comprises illuminating the laser beam from a middle of the color filter to a portion of the light blocking member and then from the light blocking member to the middle of the color filter.

18. The repairing method of claim 17, wherein the color filter has a diffusion area diffusing the light blocking member.

19. The repairing method of claim 17, wherein the adjusting the focus of the laser beam comprises:
illuminating the laser beam through a slit having a transmissive area and a light blocking area, a width of the transmissive area of the slit is smaller than that of the color filter, and
wherein the illuminating the laser beam onto the color filter comprises illuminating the laser beam from an edge of the first surface of the color filter to the light blocking member in a first direction and then in a second direction that is opposite to the first direction through the transmissive area.

20. The repairing method of claim 19, wherein the color filter has a denaturalization area that absorbs light from the light source unit and a diffusion area that diffuses the light blocking member.

21. The repairing method of claim 13, wherein the adjusting the focus of the laser beam comprises:
illuminating the laser beam through a slit having a transmissive area and a light blocking area, the slit comprises first, second and third transmissive areas, the first transmissive area being larger than the second transmissive area, the second transmissive area being larger than the third transmissive area,
wherein the illuminating the laser beam onto the color filter comprises:
illuminating the laser beam from an edge of the first surface of the color filter to the light blocking member in a first direction and then in a second direction that is opposite to the first direction through the first transmissive area;
illuminating the laser beam onto a portion of the color filter and a portion of the light blocking member with respect to borders of the color filter and the light blocking member through the second transmissive area; and
illuminating the laser beam onto the light blocking member through the third transmissive area.

22. The repairing method of claim 21, wherein the color filter has a diffusion area that diffuses the light blocking area.

23. The repairing method of claim 22, wherein an intensity of the laser beam is not sufficient to cause the color filter to be denaturalized.

24. The repairing method of claim 23, wherein a region illuminated through the first transmissive area overlaps a portion of a region illuminated through the second transmissive area.

25. The repairing method of claim 1, wherein the testing the display device comprises detecting inferiority of the color filters, and the illuminating the laser beam onto the color filter comprises illuminating the laser beam to detect the inferiority of the color filters.

* * * * *